United States Patent [19]

Carpenter

[11] Patent Number: 4,885,808

[45] Date of Patent: Dec. 12, 1989

[54] HEADBAND WITH MULTIPOSITIONED LENSPIECE

[75] Inventor: Brent Carpenter, Mesa, Ariz.

[73] Assignee: Dan J. Goodard, Phoenix, Ariz.

[21] Appl. No.: 240,793

[22] Filed: Sep. 6, 1988

[51] Int. Cl.⁴ ............................ A61F 9/02; G02C 9/02
[52] U.S. Cl. ........................................... 2/452; 2/453; 351/59; 351/155
[58] Field of Search ............... 2/453, 452, 426, 10, 2/DIG. 11, 171, 13; 351/155, 110, 59, 123

[56] References Cited

U.S. PATENT DOCUMENTS

| 4,152,051 | 5/1979 | Van Tiem et al. | 351/155 X |
| 4,541,125 | 9/1985 | Phillips | 2/453 X |
| 4,616,367 | 10/1986 | Jean, Jr. et al. | 2/453 X |
| 4,740,069 | 4/1988 | Baum | 351/59 X |

*Primary Examiner*—Peter Nerbun
*Attorney, Agent, or Firm*—Nelson & Roediger

[57] ABSTRACT

A multiposition lens piece removably attached to an absorbent headband wherein a spring member exerts a rotation-resisting force against the connecting member between lenses to prevent unwanted rotation of the lenses during use.

10 Claims, 1 Drawing Sheet

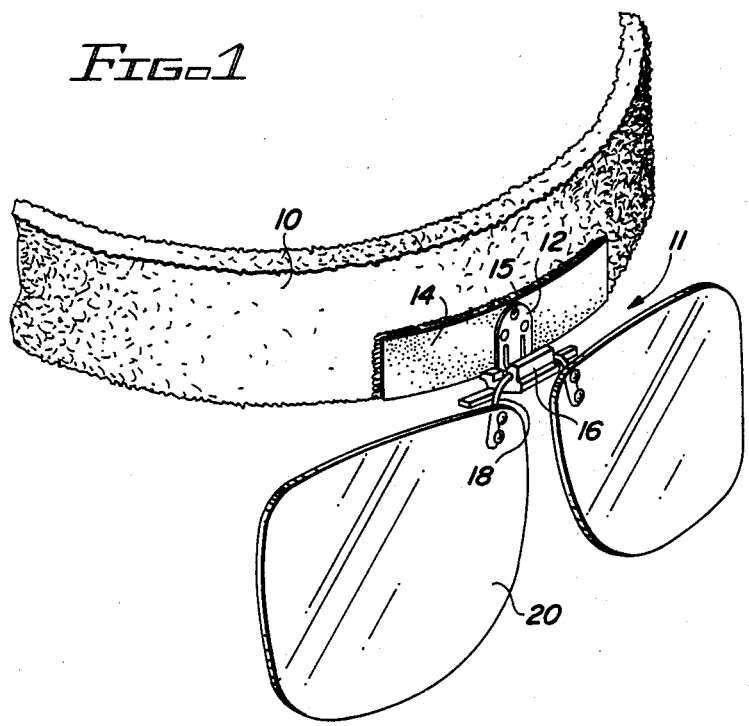
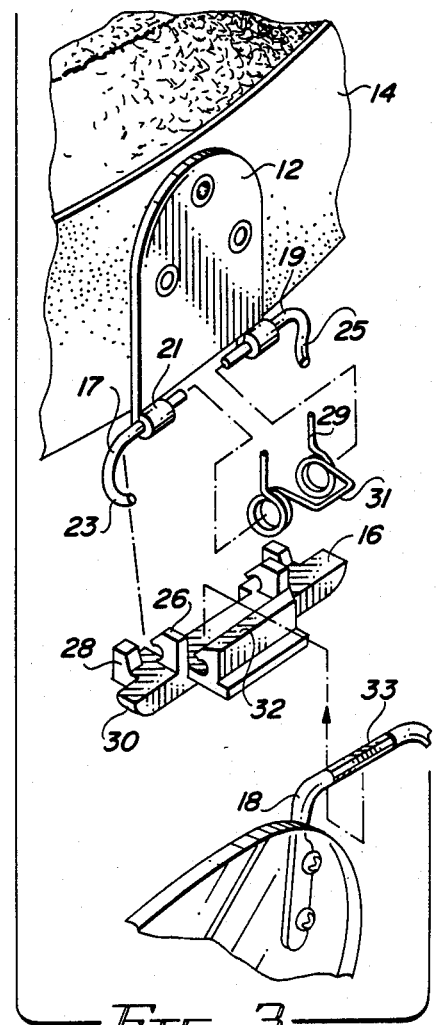
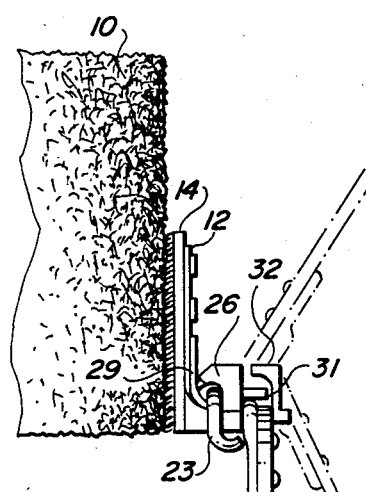
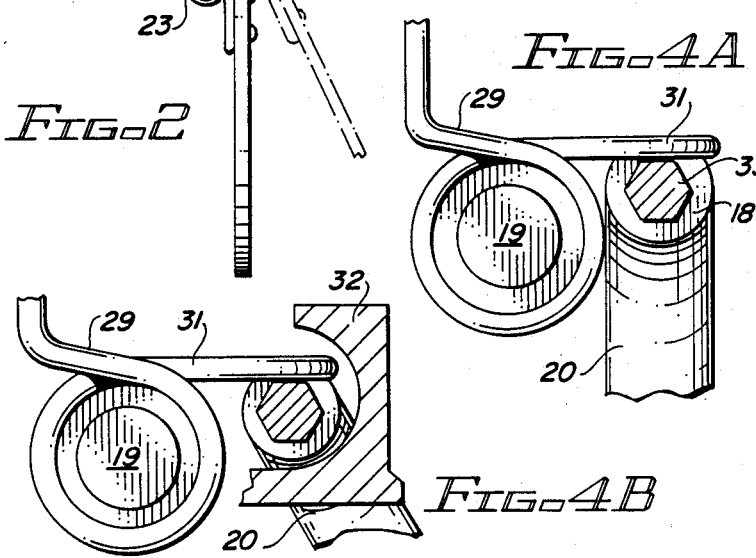
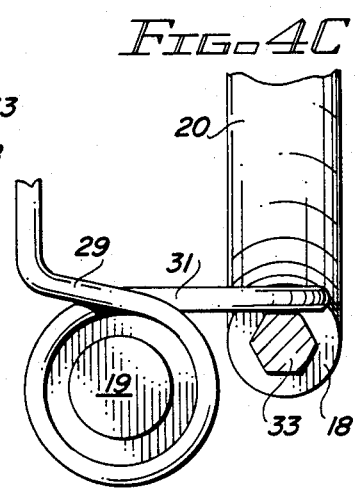

HEADBAND WITH MULTIPOSITIONED LENSPIECE

BACKGROUND OF THE INVENTION

The present invention relates to an absorbent headband removably connected to a multipositioned lenspiece.

The use of an absorbent headband by sports participants is widespread in contemporary society. For those who engage in athletic or exercise activities, the wearing of the headband reduces the flow of perspiration in and about the facial area and eye regions. Many of the wearers of these bands also use eyeglasses when active. The importance of wearing sunglasses for protection is being recognized by increasing numbers of the population. The wearer of the headband is frequently engaged in outdoor physical activity and it is commonplace to see an individual wearing both headband and sunglasses. For those who have engaged in outdoor activity while wearing sunglasses, the movement of the sunglasses during these activities is frequently a disturbing factor to one so engaged. Several products are on the market to limit movement of the glasses and they typically employ a retaining member which extends behind the head of the participant and draws the glasses firmly onto the wearers face. In order to be effective, the retaining member applies tension to the eyeglasses with the result that the pressure is transmitted to the nose and adjacent facial regions of the party wearing them.

Since the elasticized headband is firmly secured about the head of the participant, a number of devices to secure individual lenses or pairs of lenses in a lens piece to a headband have been proposed. The combination is advantageous to the wearer in that it provides both protection to the eyes in the case of sunglasses and essentially eliminates any contact between themselves and the face of the wearer. One such headband with detachable lenses is noted in U.S. Pat. No. 4,616,367 where individual lenses are detachably mounted to a headband with the lenses being adjustable for lateral movement to compensate for different eye spacing. In addition, the lenses are rotationally mounted with spring clips to the headband so that they can assume different attitudes during usage. This is important since the wearer may wish to tilt the sunglasses outwardly to accomodate prescription glasses worn therebelow or to tilt them directly outward or upwardly so that they are removed from his line of vision. While the tilting to an outwardly extending position is frequently sufficient, a total removal from the line of vision is important in active sport so that there is no interference in viewing a moving sport object.

In prior attempts to manufacture a commercially acceptable headband having multipositional lenses, it has been found that the structural aspects of the lens supports are insufficient to ensure that the lenses remain in a particular position during continued usage. The uncertainty as to whether or not the lenspiece will change position during use creates uncertainty in the mind of the sports participant with the result that he discards the device or suffers a reduction in his performance level.

Accordingly, it is an object of the present invention to provide a headband having a rotationally mounted lenspiece affixed thereto which is positively urged to remain in a particular orientation. This has been found to provide a device having little tendency for the lenspiece to move during athletic activity on the part of the user.

SUMMARY OF THE INVENTION

The present invention is directed to a multipositional lenspiece for removable affixation to a headband which has a panel attached thereto. The panel includes a pair of laterally extending arms which are opposingly spaced from the lower edge of the panel. Each of these arms is provided with an end segment that is curved so as to receive a lenspiece support member therebetween. After assembly, the lenspiece support member receives a rotation resisting means and supports the lenspiece, which is typically a pair of tinted lenses having a connecting member therebetween.

The lenspiece support member includes a pair spaced receiving sections which engage the curved end segments of the panel arms. The support member is preferably a molded plastic article which can be readily inserted into position by the user. The support member includes a central outward extension upon which resides the connecting member between the individual lenses of the lens piece. This connecting member is provided with engaging surfaces which define the position of the lenspiece when the combination is in position on the head of the wearer. A rotation resisting means is interposed between the panel and an engaging surface of the lens piece connecting member and firmly contacts an adjacent engaging surface to establish resistance to rotation of the lens piece. As a result, the wearer can change position of the lens piece in relation to his face by applying force to the lenses to overcome the force imparted by the rotation resisting means.

The connecting member between the individual lenses is provided with a plurality of engaging surfaces each of which defines separate position for the lenses. In the preferred embodiment of the invention, the connecting member is made hexagonal in cross section with six adjacent flat engaging surfaces located about its circumferential surface. This enables the wearer to not only have the lens piece extend downwardly in normal position and upwardly out of his field of view, but also enables the lenses to be rotated 60 degrees forward to accomodate the wearing of regular eyeglasses there beneath. A further rotation to a partial upward position provides a degree of shading for a situation where the sun is above the location of the user.

As a result, the present invention provides a headband with multipositional lenses that are maintained in position during normal athletic use. Further features and advantages of the invention will become more readily apparent from the following detailed description of a preferred embodiment when taken in conjunction with the accompanying drawings.

BRIEF DESCRIPTION OF THE DRAWINGS

FIG. 1. is a perspective view showing the present invention in its normal operating position.

FIG. 2 is a side view of the embodiment of FIG. 1 with several additional lens positions shown by dashed lines.

FIG. 3 is an exploded view illustrating the details of the assembly of the embodiment of FIG. 1.

FIGS. 4a, 4b, 4c are views in partial cross section of the lens piece and rotation resisting means assembly of the embodiment of FIG. 1 illustrating three positions of the lenspiece.

DESCRIPTION OF THE PREFERRED EMBODIMENT

Referring now to the drawings, and more particularly, to FIG. 1, the present invention includes an adjustable headband 10 made of a suitable extendible and absorbent material, having a multipositional lens structure designated generally as element 11 affixed thereto. The lens structure 11 is moveably coupled to a rigid panel 12 that is affixed to a fastening strip 14 by rivets 15. The combination is shown in FIG. 1 in its normal operating position with the individual lens 20 extending directly downward. Although the head of the wearer is not shown in FIG. 1, it is immediately apparent that the lenses extend downwardly in front of the eyes of the wearer when the headband encircles the head thereof.

The fastening strip is typically a synthetic fabric with a fabric fastening surface on the obscured side which meshes with a corresponding fabric fastening strip, to permit replacement and repair if necessary. Also to be noted from FIG. 1, is lenspiece supporting member 16 upon which a lens connecting member 18 resides during use. The lens connecting member rotationally moves while maintained in this location in order to obtain the full advantages of the present invention by imparting rotation of the lenses to accommodate the wearer.

In FIG. 3, the headband 10 and fastening strip 14 are partially shown with the panel 12 seen in entirety in the exploded view of the structure. The lower portion of panel 12 is provided with opposing outwardly extending arms 17 and 19. As shown, the arms have interior and exterior sections and are held in position spaced away from the bottom of the panel by a downwardly extending curved extensions 21 which frictionally engage arms 17 and 19. Each arm is provided with a curved terminating segment 23 and 25 which receives lenspiece support member 16 therebetween. The lenspiece support member is typically formed of molded plastic and can be readily urged into position between the curved end segments.

The lenspiece support member includes three elements at each end which engage the corresponding curved end segment to secure the apparatus. The notched riser 26 in combination with the inclined riser 28 cause arm 17 to snap downwardly into position while curved end segment 23 extends partially under lateral extension 30. Similar elements exist at the opposing end of lenspiece supporting member 16. As a result, the member 16 is designed to readily engage the metal arms and end segments extending outwardly and forwardly of the panel 12. Spring 29 which comprises two helically wound coils separated by a forward extension 31 is rotationally positioned on the inner ends of arms 17 and 19 so that its free ends are in contact with the panel 12. The forward spring extension 31 is received under the flange member 32 of the support member so that the spring 29, as will later be explained, exerts a positive force which resists rotation of the lenspiece when the invention is assembled.

The lenspiece includes individual lenses 20 with a lens connecting member 18 affixed thereto and extending between the lenses. The central portion 33 of the support member is provided with engaging surfaces which are flat surface regions that receive the forward spring extension 31 thereagainst. As previously noted, spring 29 is positioned so that the extension 31 underlies the flange member 32 and resides upon the central portion of connecting member 18. Thus, the spring is urged downwardly upon the central portion 33 to resist rotation of the lenses during use. The placement of the forward extension 31 of spring 19 upon central portion 33 is shown in the side view of FIG. 2 wherein the inclined or inclined riser 28 has been omitted to permit display of the spring extension 31 and its location beneath the flange 32.

The number and location of the engaging surfaces on central portion 33 of the lens connecting member are determinative of the various positions which may be assumed by the lenspiece. The rotation of the lenspiece by the user causes the particular engaging surface beneath the forward extension 31 of spring 19 to change. Each stable position for the lenspiece corresponds then to a flat engaging surface on central portion 33. In the embodiment shown, a six-sided central portion is provided to enable the user to adjust the lenspiece to four secure positions with the assurance that the lenspiece will maintain the desired position during active use. In FIG. 2, four positions are shown, the normal downward position is shown in firm outline and the forward tilt position adjacent thereto is shown by a series of dashed lines and is approximately 60 degrees forward of the downward position. In practice, the use of a pair of large lenses 20 enables the wearer of eyeglasses to utilize the present invention in combination with his corrective glasses. The next position is an upward tilt, a further 60 degrees in rotation, and is again shown in dashed outline. This position corresponds to a lens attitude that provides a degree of shielding from an overhead sun. The totally upright position is the next operating position shown in FIG. 2 and corresponds to the situation where the wearer wishes to have the lenses totally out of view thus providing essentially no sun protection.

The partial cross sectional views of FIGS. 4a, 4b, and 4c are directed to the showing of the cooperation between spring 29, lens connecting member 18 and its central portion 33 for different lenspiece positions. In FIG. 4a, the downward direct lens position is shown with the forward spring extension 31 resting securely on the adjacent flat surface of central portion 33. As noted previously in connection with FIG. 3, while free end of spring 29 is urged against the rigid panel 12 so that downward force is exerted on the central portion 33. The inner portion of arm 19 is seen centrally located in the helix spring 29 to serve as a positioning element for the spring during use. In FIG. 4b, the flange member 32 of lenspiece support member 16 is shown in cross section in order to illustrate the retaining function of flange 32. The forward spring extention 31 rests upon the central portion of the lens connecting member and is spaced adjacent the inner surface of the flange member which then maintains the forward extension in position. Since the force exerted by the spring is in a downward direction, the rotation of the lens connecting member 18 urges the forward extension slightly upward until the next engaging or flattened surface is positioned there against. The clearance or spacing between flange and spring is such that sufficient upward movement of the forward extension is provided to enable rotation of the lens connecting member. The flange 32 serves as both a protective device and aids in the alignment in the spring during assembly and in those situations wherein the user would like to replace existing lenses with a different pair having different characteristics.

The direct upward position for the lenses 20 is shown in FIG. 4c, wherein the spring extension engages the central portion of the lens connecting member in the same manner as is the case with the other positions of the lenses. The positive force of the spring member against the lens connecting member maintains the lenses in one of the designed for attitudes as shown in FIG. 2 until the user intentionally rotates the lenses by applying sufficient rotational force to overcome the downward force of the forward spring extension 31 against the central portion 33. As a result, the present invention provides a multiposition lenspiece and headband combination which permits ready assembly and disassembly in the event that the user would like to replace the lenses.

While the forgoing description has referred to a specific embodiment of the invention utilizing a structure that provides four positions for the lenses, it is to be noted that variations can be made therein, such as two or three position structures, without departing from the scope of the invention as claimed.

I claim:

1. A combination headband and multiposition lens piece which comprises:
    (a) a headband for encircling the head of the wearer;
    (b) a panel attached to said headband and including first and second laterally extending arms;
    (c) first and second end segments each of which is affixed to a corresponding arm;
    (d) a lens piece support member having a pair of spaced receiving sections for engagement with said end segments, said support member including a central outward extention for supporting a lens piece thereon;
    (e) a lens piece comprising first and second individual lenses and a connecting member therebetween, said connecting member being provided with engaging surfaces thereon, said engaging surfaces defining the positions of said lens piece;
    (f) rotation resisting means interposed between said panel and an engaging surface of the connecting member for contacting an engaging surface thereof and resisting rotation of the lens piece from the corresponding position.

2. The invention of claim 1 wherein said laterally extending arms are spaced from said panel, each arm having an interior and an exterior end, said rotation resisting means engaging the interior ends thereof.

3. The invention of claim 2 wherein said rotation resisting means comprises biasing means mounted for rotation on said interior ends and having opposing extensions which are positioned to contact the panel and an engaging surface.

4. The invention of claim 3 wherein said biasing means is a spring member having an elongated portion which is positioned to contact an engaging surface of the connecting member of said lens piece.

5. The invention of claim 4 wherein said panel is removably attached to the headband.

6. The invention of claim 4 wherein said panel is a rigid member with the laterally extending arms located at the lower end thereof.

7. The invention of claim 6 wherein the connecting member of said lens piece has a plurality of flat surfaces which are positioned by said support member between the interior ends of the arms.

8. The invention of claim 7 wherein said connecting member has a hexagonal cross-sectional area thereby forming six flat surfaces thereon.

9. The invention of claim 7 wherein the outward extension of the lens piece support member is provided with an inwardly extending flange for rotationally receiving the connecting member of the lens piece therein.

10. The invention of claim 9 wherein the elongated portion of the spring is received beneath the flange of the support member.

* * * * *